Aug. 22, 1961 C. O. DENNIS ET AL 2,996,760
RING TYPE MATRIX
Filed Nov. 13, 1958 2 Sheets-Sheet 1
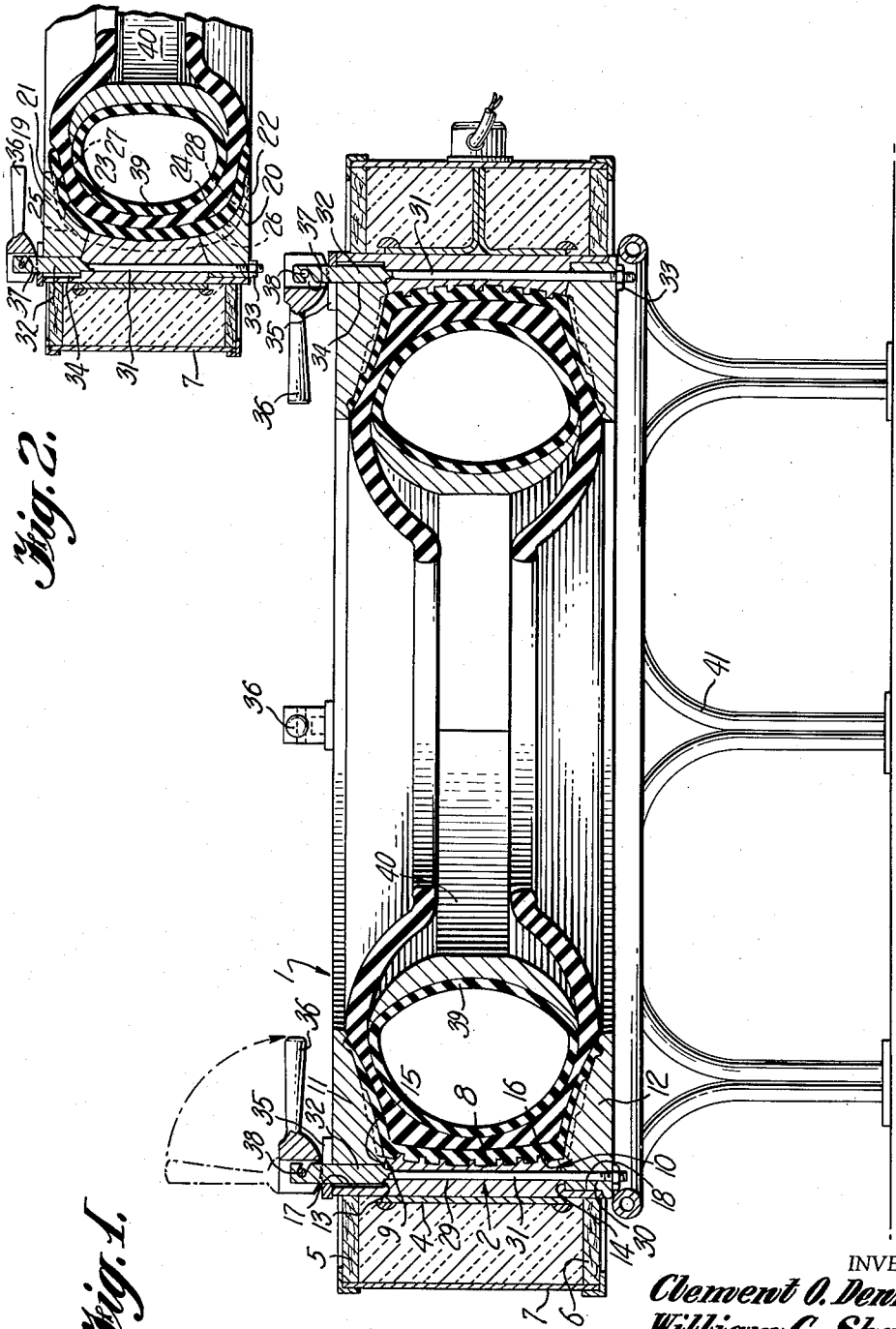
INVENTORS
Clement O. Dennis and
William C. Shaver
BY
Mason, Fenwick & Lawrence
ATTORNEYS Aug. 22, 1961  C. O. DENNIS ET AL  2,996,760
RING TYPE MATRIX Filed Nov. 13, 1958  2 Sheets-Sheet 2

INVENTORS
Clement O. Dennis and
William C. Shaver
BY Mason, Fenwick & Lawrence
ATTORNEYS United States Patent Office 2,996,760
Patented Aug. 22, 1961

2,996,760
RING TYPE MATRIX
Clement O. Dennis and William C. Shaver, Macon, Ga., assignors, by direct and mesne assignments, to Precision Recapping Equipment Company, Macon, Ga., a corporation of Georgia
Filed Nov. 13, 1958, Ser. No. 773,583
2 Claims. (Cl. 18—18)

This invention relates to apparatus for use in retreading tires and particularly to the construction of matrices for tire retreading, and is a continuation-in-part of prior application Serial No. 660,606 now abandoned, filed May 21, 1957.

Tire retreading is done in three basic ways. The first of these is top capping, which consists in replacing rubber across the tread portion of the tire only. The second is known as full capping and the tread rubber and shoulder rubber on each side of the tire is replaced. In most cases new rubber is put on the tire from the scuff bar or raised circumferential rubber bar on one side of the tire across the tread and down on the other side of the scuff bar. This replaces the entire tread and sidewall design. The third type which is not used as much as the other two is known as bead to bead retreading and provides new rubber on all of the exposed outer surface of the tire from one bead around to the opposite bead. This last type of retreading is used primarily on aircraft tires.

Due to the great demand for both top capping and full capping, it is necessary for operators to keep on hand matrices for all diameter tires and for both top capping and full capping. It is impossible to full cap a tire in a top cap matrix as the side skirts are too short and the top cap cannot be applied in a full cap matrix where there is a design on the side skirts, due to the fact that the new rubber will be forced down the sides of the tire when the curing pressure is applied inside the tire.

Attempts have been made to provide a single mold which could be used both for top capping and full capping by providing a full cap matrix with no design on the side wall skirts. While this permits both jobs to be done, there are two disadvantages to this type of matrix. One is that there will be no design on the side wall and, therefore, the retread tire will not have the same appearance as a new tire. The replacement of the side design becomes very important in connection with tires for earth moving machinery, snow tires, and other tires to be used off the highway, as the side design actually is a part of the tread and necessary for proper traction. The second disadvantage is more serious, as this affects the quality of the job and may seriously shorten the life of the tire. When a top cap is applied in a matrix having full cap skirts, a portion of the side wall skirt will be in contact with the old rubber on the sides of the tire and thus heat will be applied to the already cured rubber. This results in greatly over-curing this rubber.

In addition to the need for separate matrices to perform different retreading operations upon a single size tire, it is also necessary for the operator to keep on hand matrices of varying cavity width but of the same diameter in order to cap tires of the same diameter but of varying tread width and of different cross-sectional shapes. This is particularly true of those operators who are retreading the very large earth moving and aircraft tires where section width, tread width, or side profile vary greatly in tires of approximately the same diameter.

Retreading matrices are very costly and are becoming more costly as tread designs increase in complexity. A tremendous outlay of money is necessary for an operator to maintain all of the matrices required to retread tires of varying size and to perform all of the retreading operations. These matrices are quite large and an enormous storage area is necessary.

Most tire recapping has been done with a matrix in a mold stand where means are available to contact the sides of a tire in the matrix to counteract the side pressures which will be developed in the tire when the tire is inflated as required for curing. There has come into use a so-called band type matrix which has short side skirts which are integral with the matrix casting. Due to this construction they need no additional means to counteract the internal pressures. In order to mount a tire in this type of mold, however, it is necessary to spread the beads of the tire in an axial direction so as to reduce the overall diameter of the tire to pass through the small diameter opening of the side skirt. After the tire has been lowered to a position between the side skirts, the beads are allowed to contract and the tread portion of the tire will seat itself within the matrix. This type of mold can be used only with very short side skirts due to the limited amount which the overall diameter of the tire can be contracted. It has been impossible to use this type of mold for anything except top capping. This type of mold has many advantages, however, as it is not necessary to use the mold stand which is costly and the matrix is self-heating and self-supporting.

It is an object of the present invention to provide matrices of the band type which will be capable of retreading tires of varying widths and cross-sectional shapes with either top cap, full cap, or bead to bead capping.

Another object of the invention is to provide band type matrices having interchangeable side skirts or rings to adapt them to different retreading operations, yet having means to withstand the internal pressures which are in the tire during the curing operation.

Yet another object is to provide band type matrices having at least one side skirt removable to permit insertion and removal of tires, and having simple, self-carried means to quickly attach and detach the removable skirt, yet hold it firmly in place against internal pressures.

Other objects of the invention will become apparent with the following description of several practical embodiments thereof when taken in conjunction with the drawings which accompany, and form part of, this specification.

In the drawings:

FIGURE 1 is a vertical section through a matrix of the band type set up to full cap a tire of standard cross-sectional shape and narrow tread width;

FIGURE 2 is a view similar to FIGURE 1, but showing only one side of the matrix, with side rings increasing the width of the mold cavity in place;

Figure 3:
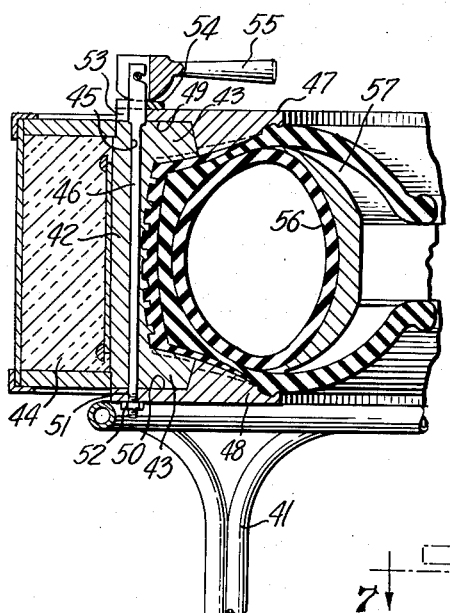
FIGURE 3 is a fragmentary section showing one side of a matrix of the band type having integral side skirts for top capping, and auxiliary side rings to convert the matrix for full capping.

In general, the invention concerns a tire retreading matrix in the form of a continuous annulus and having at least one removable side ring. It is primarily concerned with such structures in matrices of the band type with means for holding the several parts of the proposed matrix against internal side pressures developed during the curing process.

Referring to the drawings in detail, and first adverting to FIGURES 1 and 2, the matrix 1 is of the same general type as that shown in the patent to Napier No. 2,475,579, issued July 5, 1949. The matrix is of unbroken annular form and carries its own heating source. The matrix is of the so-called band type and does not need elaborate supporting structure. It can be seated upon any suitable stand.

The matrix proper 2 has mounted about it a heating chamber 3 in which is mounted an electric heating element 4 of the type shown in the mentioned patent. The element is enclosed in a boxing which comprises flat upper and lower rings 5 and 6 forming end members fitting within a cylindrical shell 7 which completes the housing. The upper ring 5 is secured to the outer periphery of the matrix and has its top surface substantially flush with the top of the matrix. The lower ring 6 is similarly mounted with respect to the bottom surface of the matrix. The matrix is of metal and will conduct heat from the heating element 4 to all parts of the tire with which it is in contact.

The unbroken annular matrix 2 has the central portion of its inner periphery shaped to provide a tread-forming face 8. Embossed with a negative of the design to be applied to the tire, this area will be arcuate from edge to edge to conform to the normal tread contour of the tire. The matrix is rabbeted at either side of the face 8 to provide seats 9 and 10 for a pair of side skirts or rings 11 and 12 which will complete the mold cavity for the extent desired for the particular retreading operation being performed. The seats 9 and 10 will comprise horizontal ledges 13 and 14, bevelled at their inner edges as at 15 and 16. The vertical side walls 17 and 18 of the seats will be circular and will conform closely to the peripheral edges of the rings. Thus, a stepped joint will be formed between the rings and matrix to prevent leakage of tread rubber under pressure or any substantial marking of the tread design at the joint line.

Rings 11 and 12 may be supplied having uniform outside diameter, but a different inside diameter to provide for the different retreading operations, and of different inner face contour to change the mold cavity as desired. The extent of the tread forming face 8 of the matrix will be approximately the width of the tread portion of the narrowest tire having the diameter of the particular matrix being used. The rings may be used to add to that tread width.

In FIGURE 2 the same matrix is shown being used for retreading with a full cap a tire which has a considerably wider tread strip than the one shown in FIGURE 1. The rings 11 and 12 have been removed and replaced by rings 19 and 20. The inner portions 21 and 22 of the rings 19 and 20 are considerably thinner than those shown in FIGURE 1, whereas the entire inner surfaces of the two rings are decidedly more concave to provide the rings with tread forming areas 23 and 24 which act as extensions of the tread forming face 8 of the matrix. It will be noted that with this arrangement the curvature of the tread surface may be carried smoothly across the entire tread area and actual tread contours may be maintained. Each of the rings 19 and 20 will carry a portion of the tread design as indicated by the dotted lines 25 and 26 and the side wall design as shown at 27 and 28.

It will be evident that by providing a matrix of predetermined inner diameter and having a tread face substantially the width of the narrowest tire of that diameter, the matrix can be converted through the use of the removable rings at top and bottom to do top capping, full capping, or bead to bead capping and to accommodate all of the different width tires having the matrix diameter. This makes it possible for the operator to have but one matrix and a full supply of ring sets to perform any recapping job on any tire of the matrix diameter. This represents a tremendous saving in money and space to the retreader.

Some means must be provided to hold the rings tightly in their seats against the internal pressures set up within the mold when curing a tire. In order to accomplish this, the matrix is provided with a plurality of vertical openings 29 at equally spaced points around its circumference, and the lower ring has a plurality of openings 30 through it identical in diameter and position to those through the matrix so that the openings 29 and 30 may be aligned. Bolts 31 having elongated polygonal heads 32 are put through the openings 29 and 30 and nuts 33 are threaded onto their ends and drawn up tightly to hold the ring securely against its seat in the matrix. The polygonal heads 32 of the bolts seat upon the horizontal ledges of the top ring seat 9 to permit the clamping action. The top ring 11, or 19 as the case may be, is notched around its edges as at 34 to permit the ring to be dropped into its seat. The elongated heads of the bolts will extend up through the notches and project above the top surface of the ring. Bearing washers 35 are positioned about the bolts and cam levers 36 are engaged with the bolts for clamping the top ring upon its seat. The upper ends of the bolt heads have horizontal notches 37 and the cam levers are bifurcated at their ends with the space between the separated arms being bridged by a pin 38. The pins are engageable with the respective bolt heads and when the levers are swung downwardly they will wedgingly cam against the washers 35 exerting a clamping action upon the ring 11.

The arrangement of bolts and cam levers provides a very positive clamping means to hold the matrix and side rings together against the internal pressure caused by an air bag 39 which is placed in the tire in conventional fashion and held against inward expansion by a curing rim 40. At the same time, the matrix can be disassembled very quickly for the removal of the tire. To accomplish this the lever 36 will be pivoted upwardly and unhooked from the notches in the bolt heads, the washers will be slipped off, and the top ring can be removed. This frees the tire for removal. If it is desired to use different rings for different retreading jobs, it is only necessary to remove the nuts 33, take off the bottom ring and replace it with one of a different shape. The nuts can then be replaced and after a tire is put into the matrix a companion top ring can be dropped in place in the ring seat and about the bolt heads 32.

The band type of matrix has many advantages over the more complicated types. It is self-sustaining and need not be used in conjunction with a mold stand. It can be positioned upon a simple rack, such as the rack 41 shown in FIGURE 1. By making the rings removable and providing adequate clamping means to hold the rings firmly in position, all of the advantages of the known band type matrix are retained and in addition the matrix is convertible to all of the different types of retreading. The advantages of retreading tires of different tread widths within a single mold can also be achieved with this type of matrix.

Figure 4:
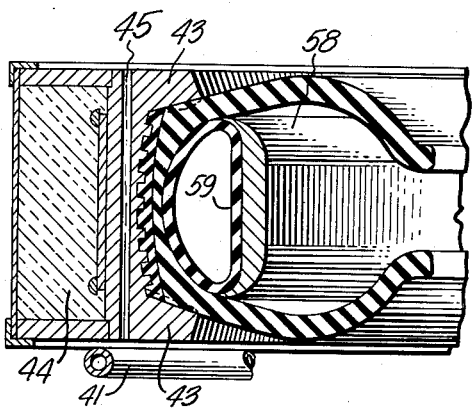
FIGURE 4 is a view similar to FIGURE 3 with the full capping auxiliary rings removed and a wide diameter curing rim in place.
Figure 5:
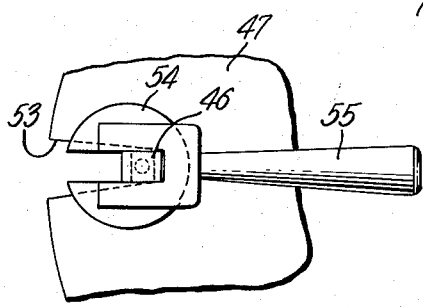
FIGURE 5 is a fragmentary detail, showing in top plan the clamping means used to hold the auxiliary rings of the band type matrix in place against internal side pressures.

In FIGURES 3 and 4 a slightly modified matrix is shown. Here the matrix 42 has short side skirts 43 cast integrally with it. The matrix in this case is substantially the same as that which is now being used. This matrix is suitable for top capping as the side skirts 43 will adequately seal against the casing side walls and yet the skirts are not too long to preclude admittance of the tire to the matrix after the tire beads have been axially spread to reduce the overall diameter. In this form of the invention, as in the form just described, the matrix carries its own heating chamber 44 and it is drilled at arcuately spaced points to provide a plurality of holes 45. When it is desired to full cap a tire with this mold the bolts 46 will be inserted through the openings 45 in the matrix and ring extension members 47 and 48 will be placed upon opposite sides of the matrix to provide additional mold surface down the side of the tire to the full extent of a full cap operation. The rings will be recessed as at 49 and 50 to fit around the side skirts of the matrix and to overlie its top and bottom sides. The bottom ring will have a plurality of openings 51 to align with the holes 45 in the matrix. When the bottom ring is in place, nuts 52 will be threaded on the bolts to clamp the ring to the matrix. The top ring will be notched as at 53 to fit over the polygonal heads of bolts 46 as in the form previously described. Washers 54 and cam levers 55 will then be put in place and the top ring clamped to the matrix by rocking movement of the cam levers.

This structure will permit full contact with the casing side walls over the necessary area and at the same time insure the parts remaining in position despite the pressures created by the curing bag 56 and rim 57.

In FIGURE 4 the matrix just described is shown without the extension rings and a curing rim 58 of much larger diameter than those previously illustrated is shown in position to bear against the interior of the casing just opposite the point of contact of the edge of the skirt with the exterior of the casing. The use of the larger ring is made possible by substituting a very flat air bag 59 for the one which has been commonly used.

Figure 6:
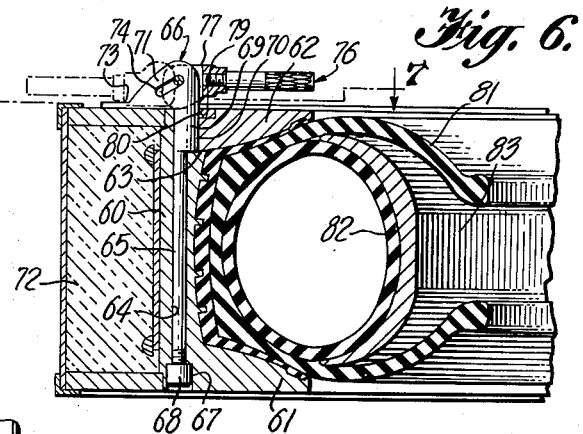
FIGURE 6 is a detail view, similar to FIGURE 3, showing a modified band type matrix having one fixed and one removable side flange, and modified clamping means to hold the removable side flange in place.
Figure 7:
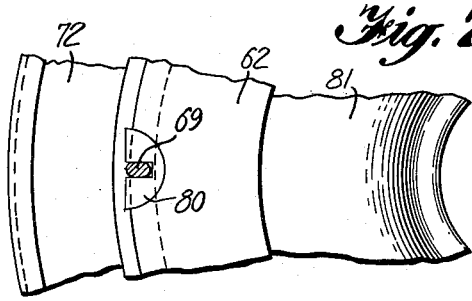
FIGURE 7 is a horizontal sectional view taken on the line 7—7 of FIGURE 6.
Figure 8:
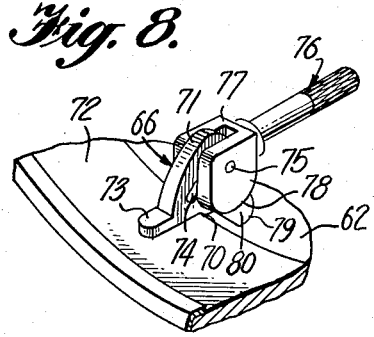
FIGURE 8 is a perspective view of one of the clamping members and adjacent portions of the matrix and removable side flange.

In FIGURES 6 to 8, inclusive, still another band type matrix is shown. Here the matrix 60 is an unbroken annulus having an integral lower side flange, or skirt 61. The flange is shown as being the width necessary to full cap. The opposite or upper flange 62 is removable and fits within a seat 63 in the inner edge of the annulus. This is similar to the manner in which the side skirts fit in the annulus recess in the form previously described.

The annulus 60 is drilled at equally spaced points to provide holes 64 to receive the shanks 65 of bolts 66. The holes 64 are enlarged at the underside of the annulus to provide seats 67 for nuts 68 which thread on the lower ends of the bolt shanks 65. Bolts 66 have their upper portions thickened, as at 69, to form non-round sections which fit within radial notches 70 in the removable upper flange 62 of the mould to position the flange and, at the same time, hold the bolts against turning in the holes 64.

The tops of bolts 66 are formed as ears 71, to project above the upper flange 62 and extending laterally to overlie the upper edges of the annulus and the surrounding housing 72. The ears extend radially of the mould, and terminate in feet 73 which rest upon the housing top. It will be obvious that when nuts 68 are tightened, the bolts will be tightly clamped to the annulus between the feet and the nuts. This will also hold the bolts properly positioned so that the notches of the flange 62 will drop over the enlarged upper portions 67 of the bolts when the flange is put into the seat 63.

As with the other forms previously described, it is necessary to hold the removable flange tightly in its seat in the annulus. To this end, the ears 71 of bolts 66 are apertured to provide inclined slots 74 to receive the pivot pins 75 of locking handles 76. These handles have bifurcated ends 77 through which the pivot pins 75 pass. The bifurcated ends of the handles have curved faces, eccentric to the pivot pins, to provide cam surfaces 78 to bear upon the top of the flange 62.

It will be noted that the slots 74 in the bolts incline toward the center of the mould and traverse the outer edge of the flange seat 63. Thus, when the handles are moved to place the pivot pins at the inner, upper ends of the slots, the cam portions of the handles overlie the flange surface. By rotating the handles about their pivots, the cam faces will be brought into wedging engagement with the flange face to bind the flange to its seat. The flange may be recessed about the notches 70, as at 79, to receive wear plates 80, against which the cam surfaces of the handles may wedgingly engage. When the handles are rotated in a reverse direction, the cam surfaces will release the flange, and the pivot pin will slide down the slot 74 to let the handle rest upon the housing 72, beyond the perimeter of the removable flange. This will allow the flange to be removed freely. Bolts 66, however, will remain tightly affixed to the annulus.

It will be understood that in this form of the invention the tire 81 is provided with the usual air bag 82 and a sectional rim 83 is put into place to hold the casing against the edges of the flanges 61 and 62 to prevent blowout of the bag.

While in the above several forms of the inventive concept have been disclosed, it will be understood that the specific details of structure shown and described are merely by way of illustration and the invention may take other forms within the scope of the appended claims.

What is claimed is:

1. Tire retreading apparatus comprising, a matrix in the form of an unbroken annulus including an inner body and side skirts at the edges of the body cooperating to form tread and side wall sections of a tire mold cavity, one of said skirts being removable from the matrix, the inner body having an annular seat around one edge to receive the removable side skirt, bolts passing through the matrix inner body and the seat at spaced points therearound, the bolts having heads elongated radially of the matrix and terminating in feet resting upon the matrix top radially outward of the seat, said bolt heads having slots therein traversing the edge of the seat to lie partially above the seat and partially over the inner body top radially outward from the seat, the removable skirt having notches around its edge to fit around the bolts passing through the seat to orient the removable skirt relative to the matrix, and cam levers having pivot pins in said slots for wedging engagement with the removable skirt, whereby the cam levers can be moved bodily inwardly of the apparatus and rotated for wedging engagement with the removable skirt and bodily outwardly of the apparatus beyond the edge of the seat when released from wedging engagement with the removable skirt so that the removable skirt may be removed.

2. Tire recapping apparatus as claimed in claim 1 wherein the slots in the bolt heads decline toward the matrix in a direction radially outward of the matrix, whereby the cam levers will move by gravity to their outward positions in the slots when the cam levers are released from wedging engagement with the removable skirt.

References Cited in the file of this patent

UNITED STATES PATENTS

| | | |
|---|---|---|
| 331,742 | Subers | Dec. 1, 1885 |
| 496,736 | Hodgson | May 2, 1893 |
| 1,275,942 | Kilborn | Aug. 13, 1918 |
| 1,583,226 | Flynn | May 4, 1926 |
| 1,633,587 | Kilborn et al. | June 28, 1927 |
| 2,259,975 | Hewel | Oct. 21, 1941 |
| 2,475,579 | Napier | July 5, 1949 |
| 2,606,342 | Kraft | Aug. 12, 1952 |
| 2,712,156 | Potter et al. | July 5, 1955 |